United States Patent [19]
Trenholm et al.

[11] Patent Number: 6,120,299
[45] Date of Patent: Sep. 19, 2000

[54] SYSTEM AND METHOD FOR INTERACTIVE SCORING OF STANDARDIZED TEST RESPONSES

[75] Inventors: Harriet Priscilla Trenholm, Monmouth Junction; Daniel Israel Zuckerman, Princeton, both of N.J.

[73] Assignee: Educational Testing Service, Princeton, N.J.

[21] Appl. No.: 08/870,182

[22] Filed: Jun. 6, 1997

[51] Int. Cl.⁷ .................................................. G09B 3/00
[52] U.S. Cl. ......................... 434/323; 434/350; 434/353; 434/322
[58] Field of Search ..................... 434/323, 322, 434/118, 324, 325, 326, 327, 346, 347, 348, 349, 350, 351, 353, 358, 359

[56] References Cited

U.S. PATENT DOCUMENTS

| | | | |
|---|---|---|---|
| 5,180,309 | 1/1993 | Egnor ....................................... | 434/323 |
| 5,211,564 | 5/1993 | Martinez et al. ........................ | 434/323 |
| 5,458,493 | 10/1995 | Clark et al. .............................. | 434/322 |
| 5,466,159 | 11/1995 | Clark et al. .............................. | 434/322 |
| 5,558,521 | 9/1996 | Clark et al. .............................. | 434/322 |
| 5,711,673 | 1/1998 | Grundy, Jr. .............................. | 434/353 |
| 5,797,754 | 8/1998 | Griswold et al. ........................ | 434/322 |
| 5,879,165 | 3/1999 | Brunkow et al. ........................ | 434/322 |

FOREIGN PATENT DOCUMENTS

WO 95/15654  6/1995  WIPO.

*Primary Examiner*—Valencia Martin-Wallace
*Assistant Examiner*—David Aaron Fleming
*Attorney, Agent, or Firm*—Woodcock Washburn Kurtz Mackiewicz & Norris LLP

[57] ABSTRACT

A system and associated method for interactively scoring standardized test responses. The system maintains a database of tests, items that make up the tests, and features that make up the items. A user of the system requests a list of items in the database, and the system responds by presenting a list from which the user selects a plurality of items to be scored. The user selects a scoring mode, and the system scores the selected items according to the selected scoring mode. In an interactive scoring mode, the system scores the features of a selected item and presents to the user the feature scores, as well as an overall item score computed based on these feature scores. The user either accepts the scores as presented, changes one or more feature scores, or changes the overall item score. The system then rescores the item based on the user-entered scores and stores the new score in the database. This process is repeated for the remaining selected items. The user can interrupt one scoring mode and change to another at any time.

23 Claims, 12 Drawing Sheets

FIG. 1 (PRIOR ART)

Questions 8–27 each consist of two quantities, one in Column A and one in Column B. You are to compare the two quantities and on the answer sheet fill in oval A if the quantity in Column A is greater;
B if the quantity in Column B is greater;
C if the two quantities are equal;
D if the relationship cannot be determined from the information given.

AN E RESPONSE WILL NOT BE SCORED

Notes:
1. In certain questions, information concerning one or both of the quantities to be compared is centered above the two columns.
2. In a given question, a symbol that appears in both columns represents the same thing in Column A as it does in Column B.
3. Letters Such as x, n, and k stand for real numbers.

| | EXAMPLES | | |
|---|---|---|---|
| | Column A | Column B | Answers |
| E1. | 2×6 | 2+6 | ●○○○○ A B C D E |
| E2. | 180−x | y | ○○●○○ A B C D E |
| E3. | p−q | q−p | ○○○●○ A B C D E |

| | Column A | Column B |
|---|---|---|
| 8. | $\frac{1}{2} - \frac{2}{5}$ | $\frac{1}{2} - \frac{2}{3}$ | r, s, and t are the degree measures of the three angles of a triangle

| 9. | r + s | t | n > 0

| 10. | 0.42 × n | 0.042 × 10n |

$\frac{3}{a} = \frac{b}{4}$

| 11. | ab | 12 |

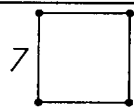
Figure A

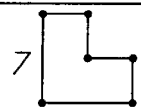
Figure B

In Figures A and B, pairs of line segments that meet at a point are perpendicular.

| 12. | The perimeter of Figure A | The perimeter of Figure B |

| | Column A | Column B |
|---|---|---|

Questions 13–14 refer to the following graph.

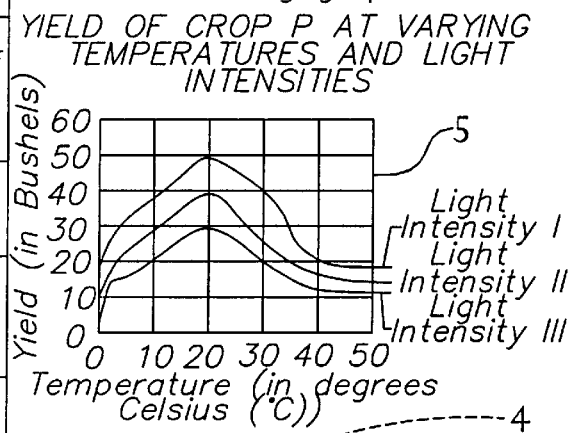

13. For the temperature range shown, the highest yield, in bushels, of crop P at light intensity II — 45

At light intensity III, for the temperature range shown, the highest yield, in bushels, of crop P is H and the lowest is L.

| 14. | H − L | 30 |

SECTION 1

| | | | |
|---|---|---|---|
| 1 Ⓐ Ⓑ Ⓒ Ⓓ Ⓔ | | 26 Ⓐ Ⓑ Ⓒ Ⓓ Ⓔ | |
| 2 Ⓐ Ⓑ Ⓒ Ⓓ Ⓔ | | 27 Ⓐ Ⓑ Ⓒ Ⓓ Ⓔ | |
| 3 Ⓐ Ⓑ Ⓒ Ⓓ Ⓔ | | 28 Ⓐ Ⓑ Ⓒ Ⓓ Ⓔ | |
| 4 Ⓐ Ⓑ Ⓒ Ⓓ Ⓔ | | 29 Ⓐ Ⓑ Ⓒ Ⓓ Ⓔ | |
| 5 Ⓐ Ⓑ Ⓒ Ⓓ Ⓔ | | 30 Ⓐ Ⓑ Ⓒ Ⓓ Ⓔ | |
| 6 Ⓐ Ⓑ Ⓒ Ⓓ Ⓔ | | 31 Ⓐ Ⓑ Ⓒ Ⓓ Ⓔ | |
| 7 Ⓐ Ⓑ Ⓒ Ⓓ Ⓔ | | 32 Ⓐ Ⓑ Ⓒ Ⓓ Ⓔ | |
| 8 Ⓐ Ⓑ Ⓒ Ⓓ Ⓔ | | 33 Ⓐ Ⓑ Ⓒ Ⓓ Ⓔ | |
| 9 Ⓐ Ⓑ Ⓒ Ⓓ Ⓔ | | 34 Ⓐ Ⓑ Ⓒ Ⓓ Ⓔ | |
| 10 Ⓐ Ⓑ Ⓒ Ⓓ Ⓔ | | 35 Ⓐ Ⓑ Ⓒ Ⓓ Ⓔ | |
| 11 Ⓐ Ⓑ Ⓒ Ⓓ Ⓔ | | 36 Ⓐ Ⓑ Ⓒ Ⓓ Ⓔ | |
| 12 Ⓐ Ⓑ Ⓒ Ⓓ Ⓔ | | 37 Ⓐ Ⓑ Ⓒ Ⓓ Ⓔ | |
| 13 Ⓐ ● Ⓒ Ⓓ Ⓔ | | 38 Ⓐ Ⓑ Ⓒ Ⓓ Ⓔ | |
| 14 Ⓐ Ⓑ Ⓒ Ⓓ Ⓔ | | 39 Ⓐ Ⓑ Ⓒ Ⓓ Ⓔ | |
| 15 Ⓐ Ⓑ Ⓒ Ⓓ Ⓔ | | 40 Ⓐ Ⓑ Ⓒ Ⓓ Ⓔ | |
| 16 Ⓐ Ⓑ Ⓒ Ⓓ Ⓔ | | 41 Ⓐ Ⓑ Ⓒ Ⓓ Ⓔ | |
| 17 Ⓐ Ⓑ Ⓒ Ⓓ Ⓔ | | 42 Ⓐ Ⓑ Ⓒ Ⓓ Ⓔ | |
| 18 Ⓐ Ⓑ Ⓒ Ⓓ Ⓔ | | 43 Ⓐ Ⓑ Ⓒ Ⓓ Ⓔ | |
| 19 Ⓐ Ⓑ Ⓒ Ⓓ Ⓔ | | 44 Ⓐ Ⓑ Ⓒ Ⓓ Ⓔ | |
| 20 Ⓐ Ⓑ Ⓒ Ⓓ Ⓔ | | 45 Ⓐ Ⓑ Ⓒ Ⓓ Ⓔ | |
| 21 Ⓐ Ⓑ Ⓒ Ⓓ Ⓔ | | 46 Ⓐ Ⓑ Ⓒ Ⓓ Ⓔ | |
| 22 Ⓐ Ⓑ Ⓒ Ⓓ Ⓔ | | 47 Ⓐ Ⓑ Ⓒ Ⓓ Ⓔ | |
| 23 Ⓐ Ⓑ Ⓒ Ⓓ Ⓔ | | 48 Ⓐ Ⓑ Ⓒ Ⓓ Ⓔ | |
| 24 Ⓐ Ⓑ Ⓒ Ⓓ Ⓔ | | 49 Ⓐ Ⓑ Ⓒ Ⓓ Ⓔ | |
| 25 Ⓐ Ⓑ Ⓒ Ⓓ Ⓔ | | 50 Ⓐ Ⓑ Ⓒ Ⓓ Ⓔ | |

FIG. 2
(PRIOR ART)

SYSTEM AND METHOD FOR INTERACTIVE SCORING OF STANDARDIZED TEST RESPONSES

FIELD OF INVENTION

The present invention relates to computer based test scoring systems. More particularly, the present invention relates to a system and method for interactively scoring standardized test responses.

BACKGROUND OF THE INVENTION

For many years, standardized tests have been administered to examinees for various reasons such as educational testing or evaluating particular skills. For instance, academic skills tests (e.g., SATs, LSATs, GMATs, etc.) are typically administered to a large number of students. Results of these tests are used by colleges, universities, and other educational institutions as a factor in determining whether an examinee should be admitted to study at that educational institution. Other standardized testing is carried out to determine whether or not an individual has attained a specified level of knowledge, or mastery, of a given subject. Such testing is referred to as mastery testing (e.g., achievement tests offered to students in a variety of subjects and the results being used for college entrance decisions).

FIG. 1 depicts a sample question and sample direction which might be given on a standardized test. The stem 4, the stimulus 5, responses 6, and directions 7 for responding to the stem 4 are collectively referred to as an item. The stem 4 refers to a test question or statement to which an examinee (i.e., the individual to whom the standardized test is being administered) is to respond. The stimulus 5 is the text and/or graphical information (e.g., a map, scale, graph, or reading passage) to which a stem 4 may refer. Often the same stimulus 5 is used with more than one stem 4. Some items do not have a stimulus 5. Items having a common stimulus 5 are defined as a set. Items sharing common directions 7 are defined as a group. Thus, questions 8–14 in FIG. 1 are part of the same group.

A typical standardized answer sheet for a multiple choice exam is shown in FIG. 2. The examinee is required to select one of the responses according to the directions provided with each item and fill in the appropriate circle on the answer sheet. For instance, the correct answer to the question 13 stated by stem 4 is choice (B) of the responses 6. Thus, the examinee's correct response to question 13 is to fill in the circle 8 corresponding to choice (B) as shown in FIG. 2.

Standardized tests with answer sheets as shown in FIG. 2 can be scored by automated scoring systems quickly, efficiently, and accurately. Since an examinee's response to each item is represented on an answer sheet simply as a filled in circle, a computer can be easily programmed to scan the answer sheet and to determine the examinees response to each item. Further, since there is one, and only one, correct response to each item, the correct responses can be stored in a computer database and the computer can be programmed to compare the examinee's response against the correct response for each item, determine the examinee's score for each item, and, after all items have been scored, determine the examinee's overall score for the test.

In recent years, the demand for more sophisticated test items has forced test administrators to move away from standardized tests with strictly multiple choice responses and paper answer sheets. Architectural skills, for instance, cannot be examined adequately using strictly a multiple choice testing format. For example, test administrators have determined that to examine such skills adequately requires standardized tests that pose to the examinee the challenge of drafting a representative architectural drawing in response to a test question. Such a response might, for example, be developed on a computer-aided design (CAD) facility.

Such tests have frustrated the ability of computers to efficiently and accurately score examinees' responses. While an architectural drawing, for example, may contain some objective elements, its overall value as a response to a particular test question is measured to some degree subjectively. Thus, a computer can no longer simply scan in an examinees responses and compare them to known responses in a database.

Initially, these tests were scored by human test evaluators who viewed the examinee's responses as a whole and scored the responses on a mostly subjective basis. This approach is obviously time consuming, and subjective. Thus, two examinees could submit exactly the same response to a particular item and still receive different scores depending on which test evaluator scored the response. A particular test evaluator might even assess different scores at different times for the same response.

Recently, computer systems have been developed that evaluate the examinee's responses more quickly, efficiently, and objectively. These systems use scoring engines programmed to identify certain features expected to be contained in a correct response. The various features are weighted according to their relative importance in the response. For example, one element of a model response to a particular item in an architectural aptitude test might be a vertical beam from four to six feet in length. The scoring engine for that item will determine whether the beam is in the examinee's response at all (one feature) and, if it is, whether it is vertical (a second feature) and whether it is between four and six feet in length (a third feature). If the beam is not in the response at all, the scoring engine might be programmed to give the examinee no credit at all for the response to that item. A feature such as this which is so critical to the response that the absence of the feature would be deemed a fatal error in the response is referred to as a fatal feature. If, for example, the beam is present and vertical, but is less than four feet long, the scoring engine might be programmed to give the examinee full credit for the existence of the beam, fill credit for the fact that the beam is vertical, but no credit for the fact that the beam is less than four feet long. Since the length of the beam is deemed not to be critical to the response in this example, the examinee still receives partial credit for the response to the item. Such a feature is referred to as a non-fatal feature. Thus, the scoring engine determines the existence of all of the features expected in the response for a given item, assesses a score for each feature present, and then adds up the weighted feature scores to determine the item score. When all the items for a particular test for a given examinee have been scored accordingly, the system assesses an overall test score.

Separately, a human test evaluator can score an examinee's response(s) to a particular item, or to a group of items, or to a whole test. Once the computer has finished scoring the test, a test evaluator may then compare the computer generated score to the score assessed by the test evaluator. If the test evaluator disagrees with the computer generated score for a particular item, the test evaluator is forced to change the score for that test manually.

Thus, one problem with the current computer-based scoring systems is that these systems are batch systems and provide no mechanism for a test evaluator to change the computer generated score online (i.e., to interact with the computer to change the score of a particular item as soon as the computer has scored that item rather than having to wait for the computer to score all the items of a test).

Additionally, a test evaluator might determine that the scoring rubric for an item is flawed and that the scoring engine that applies the flawed rubric needs to be changed. Scoring engines are currently changed in one of two ways, depending on the complexity of the change required. If the test evaluator wishes to change only one or more criteria (e.g., the beam in the above architectural test example should be from five to six feet long instead of from four to six feet long), then a change can be effected by changing the criterion in a file called by the scoring engine. If, however, the change is more complex (e.g., the algorithm used for a complex calculation might be changed, a new feature might be added, it might be determined that the material out of which the beam is made is more important than the length of the beam), then a change must be made to the scoring engine's computer program. A computer programmer usually is required to make changes to the scoring engine. Since, in general, test evaluators are not trained computer programmers, the test evaluator is forced to turn over the proposed changes to a computer programmer, wait until the programmer changes the scoring engine, and then score the item(s) of interest again. This process is obviously time-consuming and labor intensive, and requires coordination among several individuals.

Thus, a need exists for a system and method for interactive scoring of standardized test responses. Such a system and method must enable the test evaluator to change the score of a particular item or multiple items in a test, the score of one or more features of a particular item, or the overall score of a test online. Such a system must then use the test evaluator's score(s) to determine the overall test score for the examinees. Such a system must also enable the test evaluator to change the scoring engine online, and then use the changed scoring engine to rescore the item currently being evaluated, and for all subsequent scoring of that item in other tests, or for other examinees.

Although there are various computer-based scoring systems in use, to the inventors' knowledge there is no software system designed specifically to encourage users to monitor and modify the scoring of disparate test items.

SUMMARY OF THE INVENTION

The present invention fulfills these needs by providing a system and method for interactively scoring standardized test responses. The system and method enable a user to change computer generated test scores and scoring rubrics online, without the need for computer programmers, thus saving the test administrator time and money in the automated test scoring process.

In a preferred embodiment, a computer database is pre-populated with data defining a plurality of tests, items that make up the tests, and features that make up those items. The database is also populated with the test responses submitted by a plurality of examinees. A scoring rubric is predefined for each item and a number of scoring engines exist, separately from the system of the present invention, to execute the predefined scoring rubrics.

The method of the invention begins with a user of the system, usually a test analyst, using an operator workstation to request a list of the items stored in the database. The system responds by presenting the list to the user at the operator workstation. The user then selects from the list a plurality of items to be scored. The user might select items individually, or all the items for one or more selected tests, or all the items for one or more selected examinees.

Once the user has selected a set of items to be scored, the user then selects a scoring mode. In a preferred embodiment, four scoring modes are available: interactive, continuous, alarm, and sampling. The user can interrupt one scoring mode and convert to another at any time.

In an interactive scoring mode, the system scores items one at a time, waiting for user input after each item is scored. For each selected item, the computer calls a scoring engine to score the item. The scoring engine uses the predefined scoring rubric to score the individual features of the selected item and calculate an overall item score based on a weighted combination of the feature scores. The computer accepts these results from the scoring engine and presents the results to the user at the operator workstation.

Next, the user chooses whether to accept the scores as presented, change one or more feature scores, change the overall item score, and/or change the scoring rubric for the item. If the user wishes to change the overall item score, the user enters the new item score at the operator workstation and the system stores this new score in the database. Similarly, if the user wishes to change one or more feature scores, the user enters the new feature scores at the operator workstation. The system then rescores the item based on the user-entered feature scores and stores the new scores in the database. If the user determines that the scoring rubric itself is flawed, the user enters one or more changes to the scoring rubric at the operator workstation. The system then reprograms the scoring engine to execute the changed rubric. Once the user is satisfied with the scores and the scoring rubric, the user instructs the computer to move on to the next selected item. This process is repeated for the remaining selected items.

In a continuous scoring mode, the computer scores all of the selected items without soliciting user input and stores the scores in the database. The user does not change any feature score, item score, or scoring rubric in continuous scoring mode. Thus, continuous scoring mode is used when the user is satisfied that the scoring rubrics are correct for all the items to be scored.

In an alarm scoring mode, the computer scores the selected items without user intervention, unless an alarm condition is identified by the scoring engine. If an alarm condition is identified, the system notifies the user at the operator workstation. The user then chooses to accept the scores, to change one or more feature scores, to change the overall item score, or to change the scoring rubric, in the same manner as described above for interactive scoring mode.

In a sampling scoring mode, the computer displays to the user a subset of the selected items which have been scored. In a preferred embodiment, the subset consists of every nth item, where n is an integer. The computer scores all of the selected items without soliciting user input and stores the scores in the database. The user does not change any feature score, item score, or scoring rubric in sampling scoring mode. However, the user might use the results of sampling scoring mode to determine whether the scoring rubric for a particular item is correct.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 1 shows a sample question and sample direction which might be given on a standardized test;

FIG. 2 shows a typical standardized answer sheet for a multiple choice exam;

DETAILED DESCRIPTION OF THE PREFERRED EMBODIMENT

Figure 3:
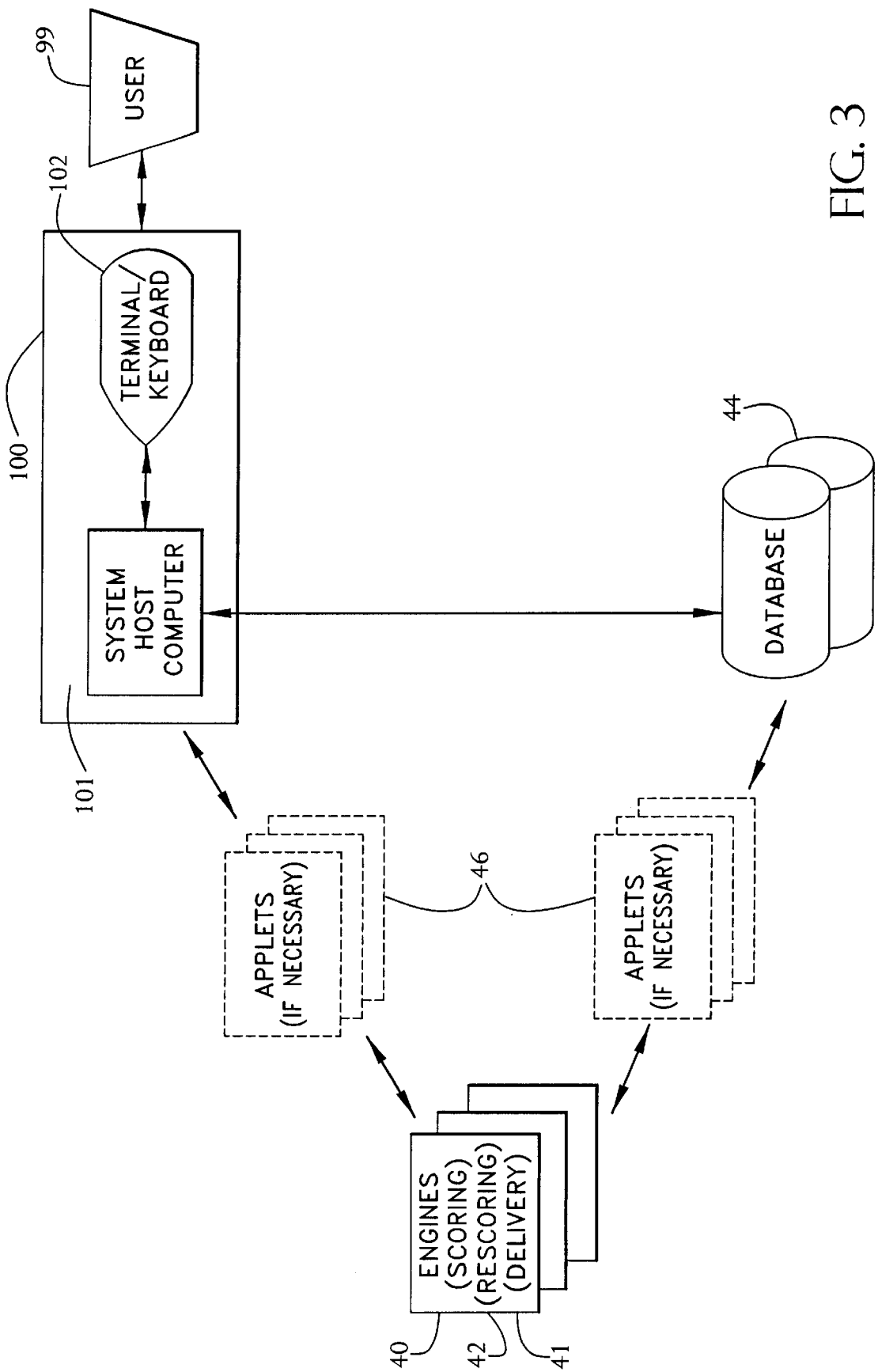
FIG. 3 shows a block diagram of external interfaces to the system of the present invention.

The system of the present invention is preferably implemented as a software program for managing and monitoring computer-based scoring software allowing its users to modify machine-generated scores where desired. The system not only provides an interface between the computer-based scoring software and the individuals whose job it is to score tests with, or validate the scoring rubrics of, these various software programs, it also manages the data generated by the computer-based scoring software and the users.

A test consists of one or more items that taken together measure the skills or knowledge of an examinee. A test response is a collection of a particular examinee's responses to all the items which make up the test. If there is more than one item, a test includes a way of combining performance on individual items into a composite score. A test scoring matrix is a data structure containing the weights and possible scores on the items which make up the test. It is used to determine an examinee's overall test score from the scores that have been earned on individual item responses. The test response score is the score that the scoring engine assigned to this particular test response. The test response rescore is the score that the re-scoring engine assigned after human intervention at the feature or item level for any item in this particular test response or the score that was assigned by human intervention at the test level for this particular test response.

The system preferably computes scores on an item-by-item basis. An item is a question, problem, or exercise intended to be given to an examinee in order to measure a particular skill or cluster of skills. An item response is a particular examinee's response to a particular item. The item response score is the score that the scoring engine assigned to this particular item response. The item response rescore is the score that the rescoring engine assigned after human intervention at the feature level for this particular item response or the score that was assigned by human intervention at the item level for this particular item response. An item scoring matrix is a data structure designed to contain the weights and possible scores on the features which make up the item. It is used to determine an examinee's overall item score from the scores that have been earned on individual features within an item response.

The system makes use of three types of existing software subsystems, or engines, to display and score item responses. The first type, the scoring engine, is an independent software subsystem that does computer assisted scoring of the item in question. The second type, the re-scoring engine, is an independent software program that combines the original computer derived feature response scores with any changes made by the user to derive a new score for an examinee's item response. The third type, the delivery engine, is an independent software program that displays an item and an examinee's response to that item. The system also makes use of existing software programs, or applets, that provide any data transfer and manipulation necessary to allow the data to be shared between a scoring engine, a re-scoring engine, and/or a delivery engine and the system.

A feature is a specific attribute of an item. It is through evaluating individual features that the computer is able to determine a score for the item. The scoring engine for a particular item is responsible initially for determining the feature scores for any particular item response. The feature response score is the computer generated score initially assigned to the feature by the scoring engine.

The computer may check for the presence or absence of a particular feature or may check for specific values for individual feature criteria. There are two different types of features: fatal and non-fatal. Fatal features are those features considered significant enough that a failure on the feature so significantly impacts the performance on the item that there is no need to continue checking any other features for this particular item. All other features are considered to be non-fatal features. Individual scoring and re-scoring engines may or may not make use of feature type.

If appropriate, features can have various variables whose values will be checked by the item scoring engine. It is up to individual scoring and re-scoring engines whether or not they wish to make use of feature variables. If, and only if, a feature has variables, then criteria specifications define how the possible variables will be translated into a score on this feature.

Features that are sufficiently complex may themselves be made up of sub-features. A sub-feature is functionally the same as the feature, with the exception that the score of a sub-feature feeds into the score of a feature directly, whereas the score of a feature feeds into the score of an item. If, and only if, a feature has sub-features, then a feature scoring sub-matrix is used. A feature scoring sub-matrix is functionally the same as an item scoring matrix, with the exception that the sub-matrix is used to determine an examinee's overall feature score from the scores that have been earned on the individual sub-features, whereas the item scoring matrix is used to determine an examinee's overall item score from the scores that have been earned on individual features within an item response.

As will be described in detail below, once the scoring engine has completed scoring all the features of an item, the user might change the score of any or all features in an item. The feature response rescore is the score that is assigned by human intervention at the feature level for this particular item response.

The user is any person who can sign-on to the system. Basically users will fall into two categories—those people involved in some way with the test scoring process and those people involved in some way with the maintenance of the system itself. The user ID is used internally by the system to refer to a particular user. The system also stores information under each user ID regarding that user's full name, e-mail address, mailing address, phone number, etc.

In a preferred embodiment, the system has several security mechanisms in place to restrict the types of functions that the user can perform and to provide a history of system usage. The system requires that the user enter a password to be able to access the system. A user is assigned to a particular group or groups. A test is also assigned to a particular group. The user group and the test group must match in order for the user to have access to test information. The system maintains logs for each user containing, among other things: the user ID of the person who added this user to the system; the date that the user was added to the system; and the date the user last signed-on to the system. Finally, several types of users are permitted including, but not limited to, test developer, test scorer, and system administrator. Each type of user has different system privileges.

As illustrated in FIG. 3, a user 99 interfaces with the system 100, including host computer 101, using a terminal, keyboard, mouse, or other similar human/machine interface 102. The system 100 interfaces with an existing database 44 that holds all the information about the tests, items, features, engines, item responses, and scoring data. In a preferred embodiment, the database 44 may have any or all of the following tables:

a. a criterion table holding information about a feature's variable values, operands and score cut-offs;

b. an external error message table holding error messages that are generated by the engines or by the system itself;

c. a feature table holding information about the feature—booleans to indicate if the feature is fatal, whether or not the feature is currently active, and if the feature has a sub matrix; and text descriptions of the feature, matrix information (if any) and the data type of the allowed scores;

d. a feature node table holding information about a particular examinee's response on a feature—the score assigned by the scoring engine and the revised score (if any);

e. a feature smart list table holding information about the data type of the feature's allowable scores if the data type is a smart list;

f. a group table holding the defined groups of which specific tests may be members;

g. a history table holding log information about actions performed and when and by whom they were performed;

h. an item table holding information about the test item—booleans to record if the item is active, if it can be machine scored, and if it can be edited; text describing the item name, data type of allowed score, range information for score data types where that is meaningful, a code for the rescoring engine, scoring engine, and delivery engine, and solution engine that this item uses;

i. an item/feature combination table used to link particular features with particular items;

j. an item node table holding information about a particular examinee's response on an item—examinee ID, test ID, score, revised score, item ID and status (either unscored, unreviewed, updated, deferred, or scored);

k. a program table holding information about the engines or applets—booleans to indicate if the program is active, if there is a parameter to indicate the solution being scored and if there should be spaces before and after the parameter in the call; text to indicate the part of the call that occurs before the parameter, and the part of the call that occurs after the parameter (if any); and a code to link this program with its item;

l. a raw feature score table as a temporary holding place for the solution ID, feature ID and score that has been assigned by the scoring engine or rescoring engine;

m. a raw feature variable values table as a temporary holding place for cut-off values for criterion variables, as well as information about solution IDs and feature IDs;

n. a raw item score table as a temporary holding place for the solution ID and its score;

o. a raw solution ID table to link solution IDs, item IDs and test IDs;

p. a smart list table holding information about the data type of the item's allowable scores if the data type is a smart list;

q. a test table holding information about the test—test name, group it belongs to, the date the test was created and the date of its last modification, a boolean to indicate if it is active, the code for the tests delivery engine, rescoring engine, and scoring engine;

r. a test item combo table holding information to link the test with its items;

s. a user table holding information about the user—name, E-mail, mail stop, phone, who authorized the user, the type of user (this controls functions that will be available to the user), the group of which the user is a member (this controls the tests the user will be allowed to access), and the password; a boolean to indicate if the user is active or not; and the date the user was created and the date the user record was last modified; and t. a user types table containing the list of allowed user types.

In a preferred embodiment, the information about users, tests, items, and features, along with the examinees' responses are batch-loaded into the database 44.

The system also interfaces with a number of preexisting scoring engines 40, rescoring engines 42, and delivery engines 41 described above. The system 100 might call the engines directly, or through the use of applets 46. It should be understood that an applet 46 is a small applications program designed to serve as an interface between otherwise incompatible software programs. Similarly, the engines might call on the database 44 directly, or through the use of applets 46.

Figure 4:
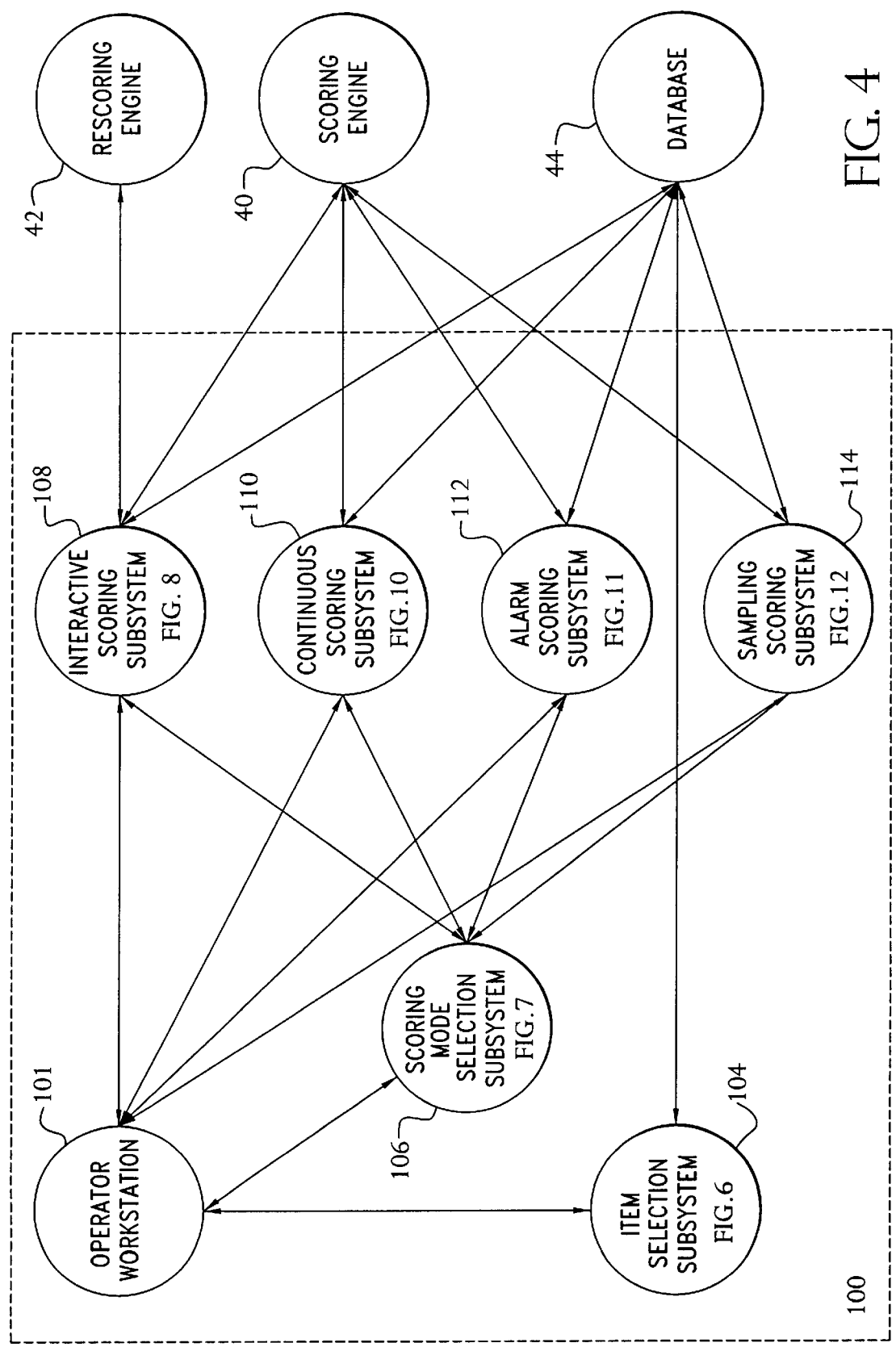
FIG. 4 shows a diagram of the subsystems and internal interfaces of the system of the present invention.
Figure 6:
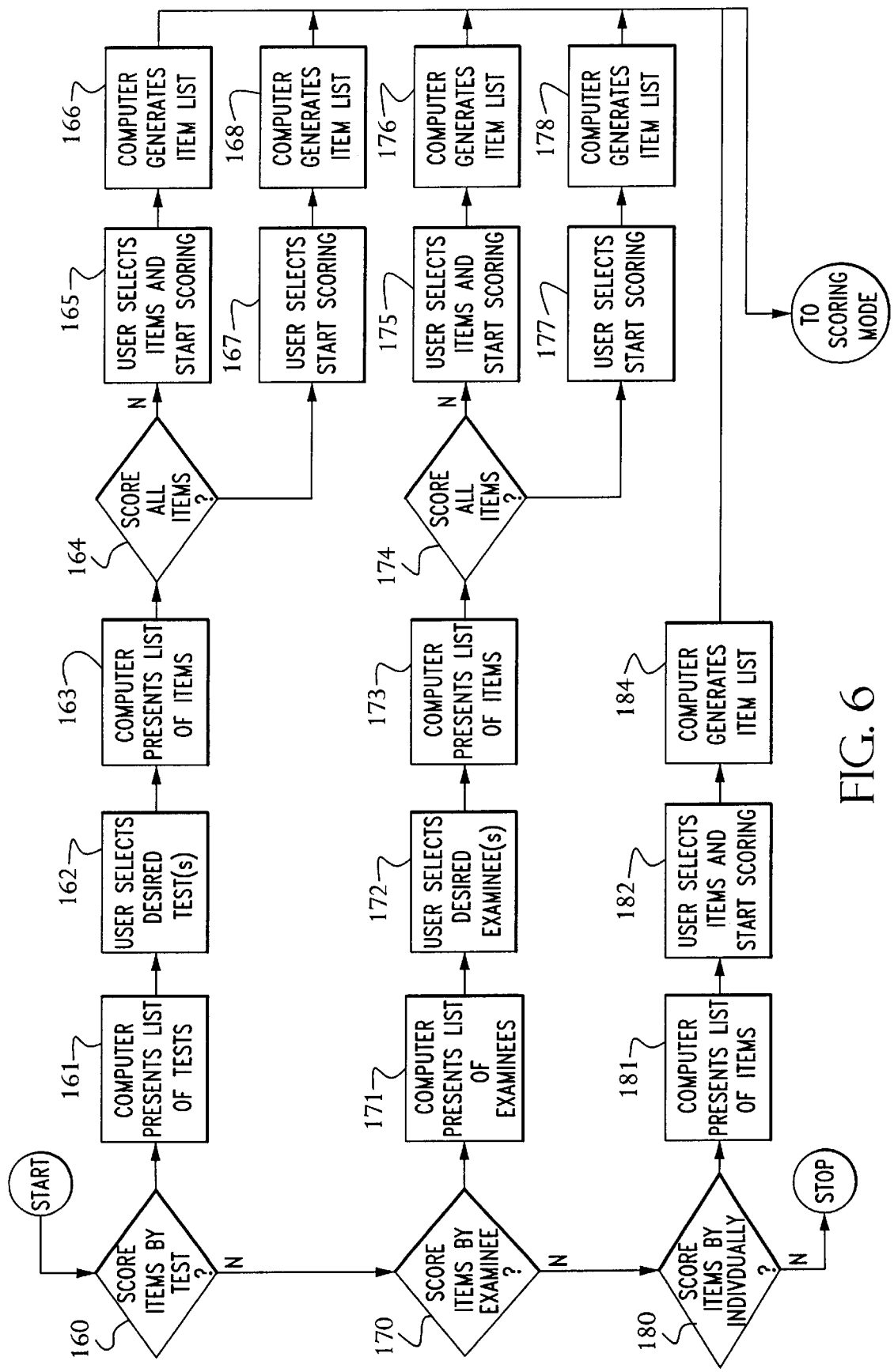
FIG. 6 shows a flowchart of the functions performed by an Item Selection Subsystem.
Figure 7:
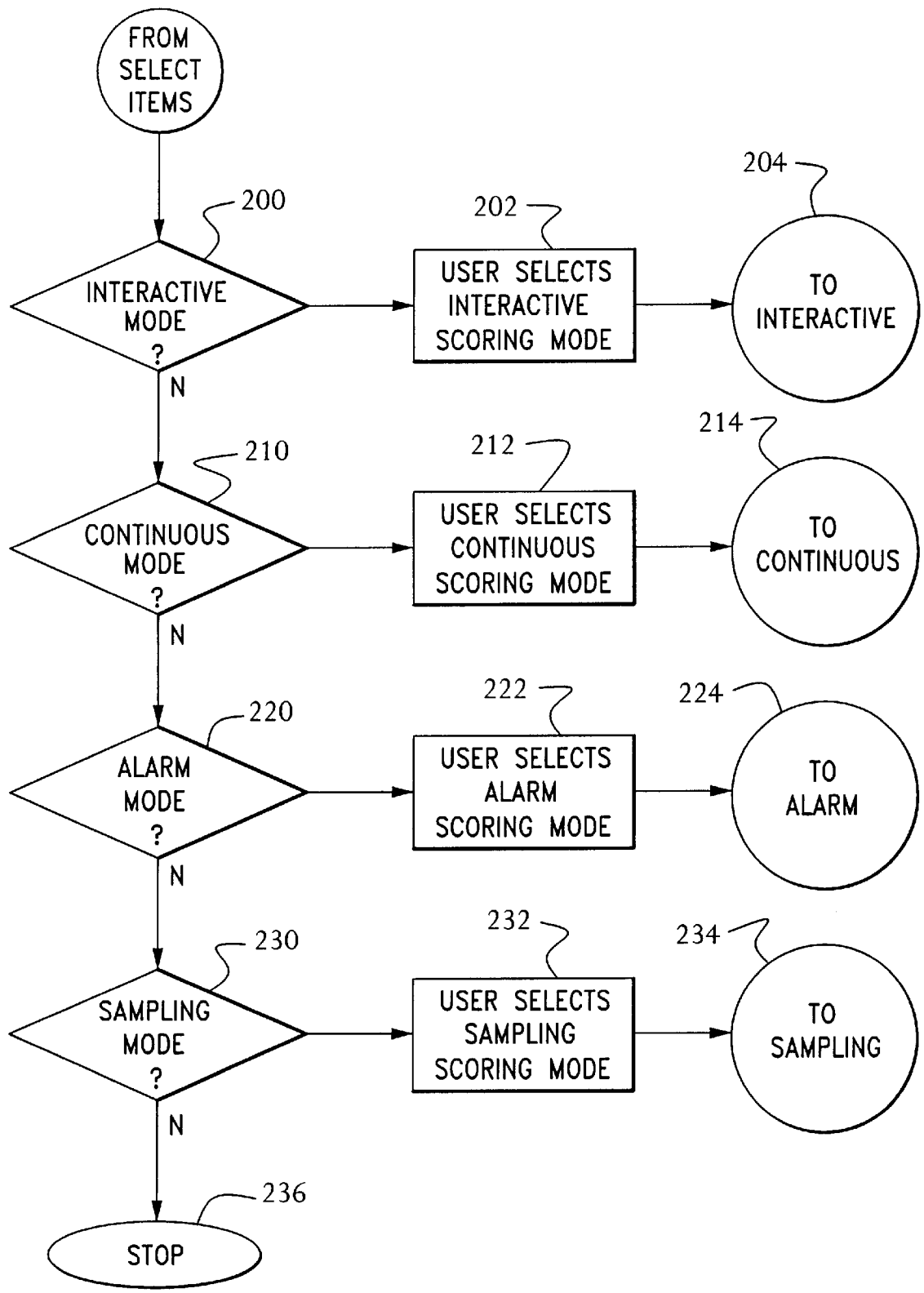
FIG. 7 shows a flowchart of the functions performed by a Scoring Mode Selection Subsystem.

FIG. 4 shows a bubble diagram of the software subsystems making up a preferred embodiment of the system 100. An operator workstation (OWS) 101 interfaces with an item selection subsystem 104 which, in turn, interfaces with a predefined database 44. The functions performed by an item selection subsystem 104 are shown in FIG. 6 and described in more detail below. The OWS 101 also interfaces with a scoring mode selection subsystem 106 which, in turn, interfaces with a plurality of scoring subsystems: an interactive scoring subsystem 108, a continuous scoring subsystem 110, an alarm scoring subsystem 112, and a sampling scoring subsystem 114. The functions performed by the scoring mode selection subsystem 106 are shown in FIG. 7 and described in more detail below. Each scoring subsystem interfaces with the OWS 101, predefined scoring engines 40, predefined rescoring engines 42, and the predefined database 44. The functions performed by the interactive, continuous, alarm, and sampling scoring subsystems are shown in FIGS. 8, 10, 11, and 12, respectively, and described in more detail below.

In a preferred embodiment, the system 100 is run on a personal computer (PC), including a monitor, keyboard, and mouse. The software subsystems 104, 106, 108, 110, 112, and 114 form a portable software package preferably run on the PC. The scoring engines 40 and the rescoring engines 42 are preferably run on the same PC as the system software. The applets 46, which serve as interface vehicles between the system and the scoring engines 40, rescoring engines 42, and database 44 are also preferably run on the same PC as the system software. The database 44 preferably resides on a separate computer. The system 100 communicates with the database computer preferably via a local area network (LAN).

In an alternate embodiment, the system software might be run on a mainframe computer, or other similar platform. It should be understood that if the computer on which the system software is run provides sufficient resources in terms of memory and computational power, the database 44 might reside on the same computer as the system software, engines, and applets. Conversely, the engines need not be run on the same computer as the system software. The system software might be run on one computer, the engines run on another, and the database resident on a third, all of which communicate via a LAN.

Figure 5:
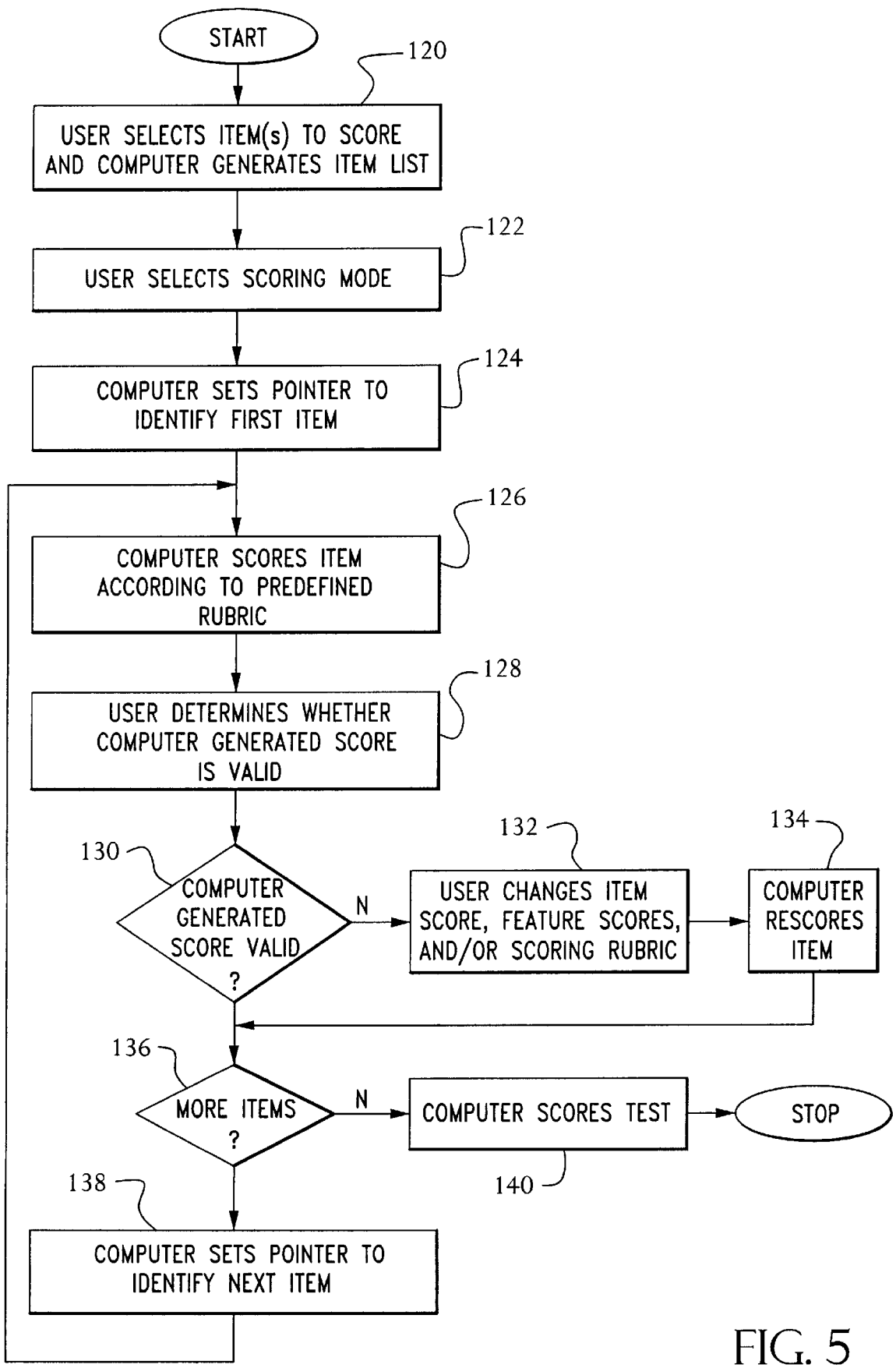
FIG. 5 shows a flowchart of the operations of the system of the present invention.

FIG. 5 shows a flow diagram of a method for interactively scoring test responses using the system 100. As illustrated in FIG. 5, the user begins at step 120 by selecting a number of items to be scored. The system responds by generating a list of selected items. The user then might select, at step 122, one from among a number of scoring modes. At step 124 the system 100 begins the process of scoring selected items by setting an internal pointer to identify the first selected item. At step 126 the system 100 calls a scoring engine 40 to score the selected item according to a predefined rubric. The system 100 displays the item score to the user at the OWS 101. The user then determines at step 128 whether the score is valid. If the user determines at step 130 that the score is not valid, the user might then change the item score or the scoring rubric, or both, at step 132. If the user changes the item score or scoring rubric at step 132, the computer rescores the item at step 134 and stores the new item score and scoring rubric in the database 44.

If the user determines at step 130 that the scores are valid for the selected item, or if the user has made changes according to steps 132 and 134, the system 100 then checks at step 136 to see if there are any more selected items to be scored. If there are more selected items to be scored, the system sets the pointer to identify the next item to be scored at step 138 and proceeds to score the next item at step 126. This process continues until the system determines that there are no more selected items to be scored at step 136. The system 100 then computes a score for the test(s) comprised by the selected items at step 140 and then stops processing.

While FIG. 5 provides a general overview of the functions performed by the system of the present invention as a whole, FIGS. 6 through 12 provide more detailed descriptions of the specific functions performed by the subsystems shown in FIG. 4 using the method shown in FIG. 5. Like reference numerals correspond to like elements in the drawings.

FIG. 6 shows the functions of the item selection subsystem (ISS). The user begins by selecting items to be scored. The user may select items to be scored in one of three ways: individually, by test, or by examinee.

If the user chooses to score items by test at step 160, the computer responds by presenting a list of tests available to the user at step 161. At step 162, the user selects the test(s) to be scored and the computer responds at step 163 by presenting the user with a list of items that make up the selected tests. At step 164 the user decides whether to score all the presented items, or to score only a subset of the presented items. If the user decides at step 164 to score only a subset of the presented items, the user selects such a subset and then commands the computer to start scoring at step 165. In a preferred embodiment, the user highlights the items to be scored and then selects a "start scoring" button. In response, the computer generates a list of all selected items at step 166. If the user decides at step 164 to score all of the presented items, the user commands the computer to start scoring at step 167. In response, the computer generates a list of all items for all selected tests at step 168.

If the user chooses to score items by test at step 170, the computer responds by presenting a list of examinees available to the user at step 171. At step 172, the user selects the examinee(s) whose responses are to be scored and the computer responds at step 173 by presenting the user with a list of items that make up the selected examinees' responses. At step 174 the user decides whether to score all the presented items, or to score only a subset of the presented items. If the user decides at step 174 to score only a subset of the presented items, the user selects such a subset and then commands the computer to start scoring at step 175. In a preferred embodiment, the user highlights the items to be scored and then selects a "start scoring" button. In response, the computer generates a list of all selected items at step 176. If the user decides at step 174 to score all of the presented items, the user commands the computer to start scoring at step 177. In response, the computer generates a list of all items for all selected examinees at step 178.

If the user chooses to score individual items at step 180, the computer responds by presenting a list of items available to the user at step 181. At step 182, the user selects the item(s) to be scored and then commands the computer to start scoring the selected items. In a preferred embodiment, the user highlights the items to be scored and then selects a "start scoring" button. In response, the computer generates a list of all selected items at step 184.

Once the user has completed selecting items to be scored, the computer presents the user with a choice of scoring mode. As illustrated in FIG. 7, which shows the functions of the scoring mode selection subsystem (SMSS), the user then selects one of four scoring modes: interactive, continuous, alarm, or sampling.

Figure 8:
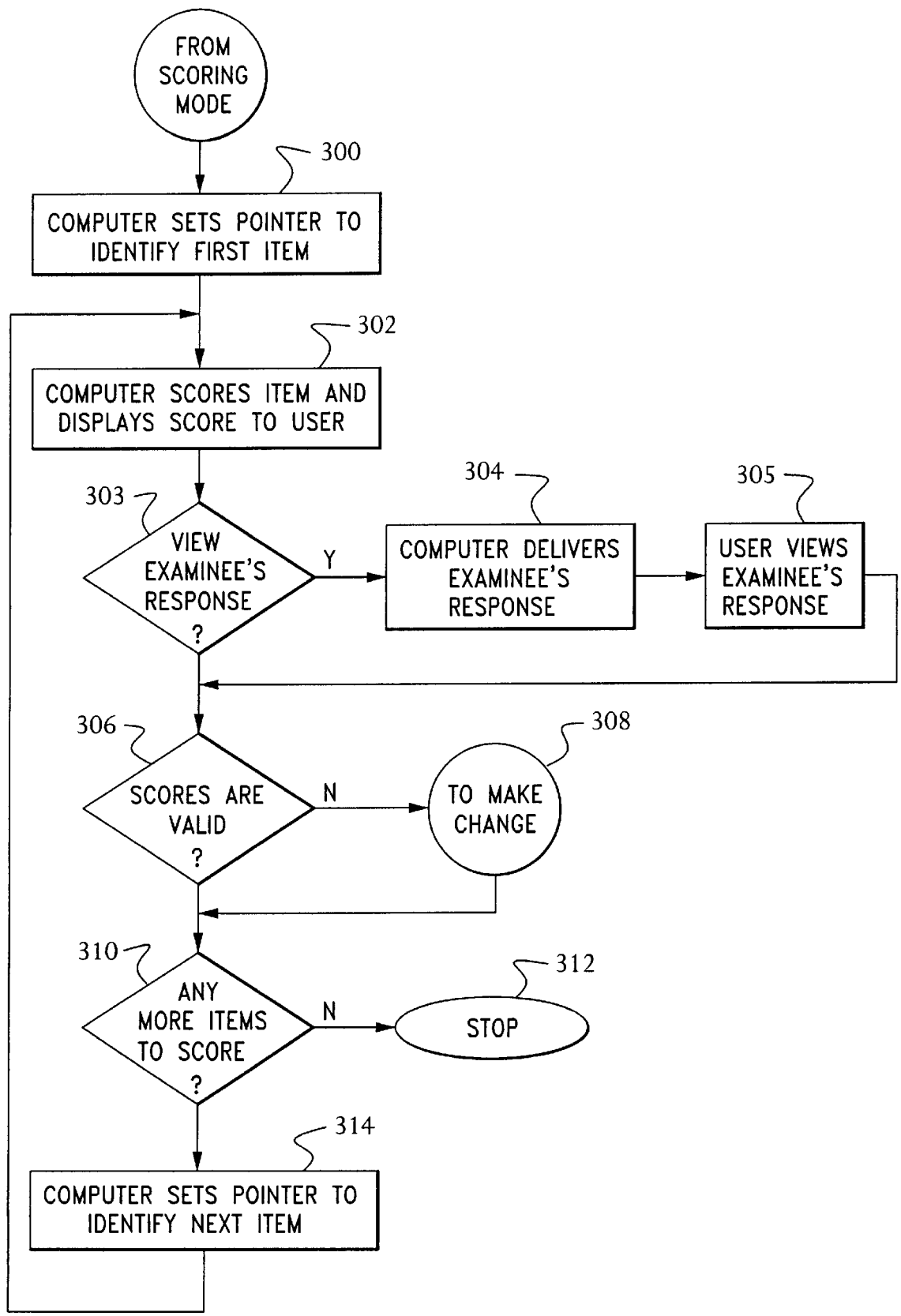
FIG. 8 shows a flowchart of the functions performed by an Interactive Scoring Subsystem.

If the user selects interactive mode at step 200, the scoring mode selection subsystem initiates the interactive scoring subsystem at step 202 (see FIG. 8). If the user selects continuous mode at step 210, the scoring mode selection subsystem initiates the continuous scoring subsystem at step 212 (see FIG. 10). If the user selects alarm mode at step 220, the scoring mode selection subsystem initiates the alarm scoring subsystem at step 222 (see FIG. 11). If the user selects sampling mode at step 230, the scoring mode selection subsystem initiates the sampling scoring subsystem at step 232 (see FIG. 12). If the user does not wish to select any scoring mode, the user may choose to stop scoring at step 236, and resume scoring any remaining unscored items later.

The functions of an interactive scoring subsystem (INT) 108 are shown in FIG. 8. The INT 108 begins at step 300 by setting an internal pointer to identify the first selected item. At step 302, the INT 108 calls the scoring engine 40 for the first selected item. The scoring engine 40 scores each feature in the examinee's response to the first selected item and returns the scores to the INT 108. The INT 108 then updates the database 44 with the feature scores and the overall item score and delivers the scores to the OWS 101 for presentation to the user. The OWS 101 then displays a list of features for the selected item along with each feature score and the overall item score.

The user then determines whether the feature scores and the overall item score are valid for the examinee's response to the selected item. At step 303 the user chooses whether to view the examinee's response to the item being scored. If the user chooses to view the examinee's response at step 303, the computer responds at step 304 by delivering the examinee's response to the OWS 101 for presentation to the user. The user then views the examinee's response at step 305.

Whether or not the user chooses to view the examinee's response at step 303, the user determines whether the scores are valid at step 306. If the user determines at step 306 that all the feature scores, as well as the overall item score, are valid, the user instructs the computer to resume scoring. In response, the computer checks at step 310 whether any unscored items remain. If there are no more items to be scored, the process stops at step 312. If there are more selected items to score, the computer sets the pointer to identify the next item to be scored at step 314, and repeats the process beginning at step 302 for the next selected item.

If, at step 306, the user determines any score to be invalid, the user makes changes to one or more feature scores, or the overall item score at step 308. The process of making changes is illustrated in FIG. 9.

Figure 9:
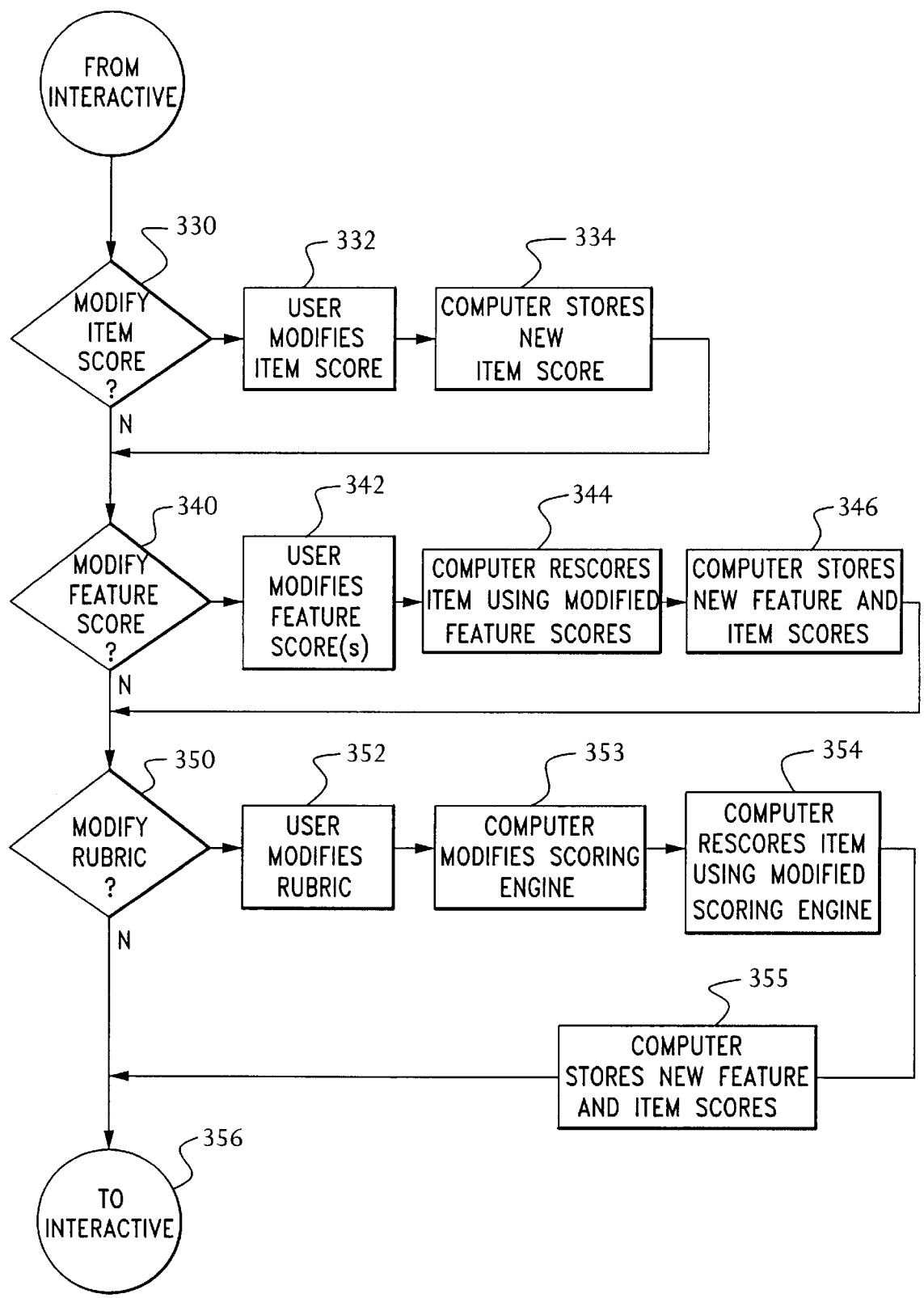
FIG. 9 shows a flowchart of a method for changing scores used by the Interactive Scoring Subsystem.

As shown in FIG. 9, if the user determines that the overall item score is invalid, the user chooses to modify the overall item score at step 330. At the OWS 101, the user enters a new overall item score for the item at step 332. At step 334 the computer stores the new overall item score in the database.

If the user determines that one or more feature scores are invalid, the user chooses to modify feature scores at step 340. At the OWS 101, the user enters a new feature score for one or more features at step 342. At step 344, the computer stores the new feature score(s) in the database and calls a rescoring engine to compute a new overall item score for the selected item using the new feature score(s). The computer stores the new overall item score in the database at step 346.

If the user determines that the scoring rubric is invalid, then the user chooses to modify the scoring rubric at step 350. The user might determine that the rubric is invalid for any of a number of reasons. For example, a scoring engine that consistently returns incorrect scores for certain features may be programmed improperly and need to be reprogrammed, or the user may reassess the importance of a particular feature and wish to adjust that feature's weighting value, or the user may wish to change the limits on a particular scoring criterion. If, for any reason, the user determines that the scoring rubric is invalid at step 350, the user modifies the rubric at step 352 by entering the desired changes at the OWS 101. The computer updates the rubric at step 353 by calling an applet to modify the scoring engine according to the changes entered by the user. At step 354, the computer rescores the item using the modified scoring engine and, at step 355, the computer updates the database 44 to indicate that a change has been made to the rubric and updates the scoring engine 40.

When the user decides that all feature scores, the overall item score, and the scoring rubric are valid, the user instructs the computer, at step 356, to return to interactive scoring (FIG. 8). The computer then scores any remaining items as described above. In a preferred embodiment, the user can choose to defer the scoring of a particular item or items until a later time such as, for example, when an expert is available to review the scores for those items. If the user wishes to defer scoring of any item(s), the user chooses to interrupt the scoring session and then resumes scoring the unscored items later.

Figure 10:
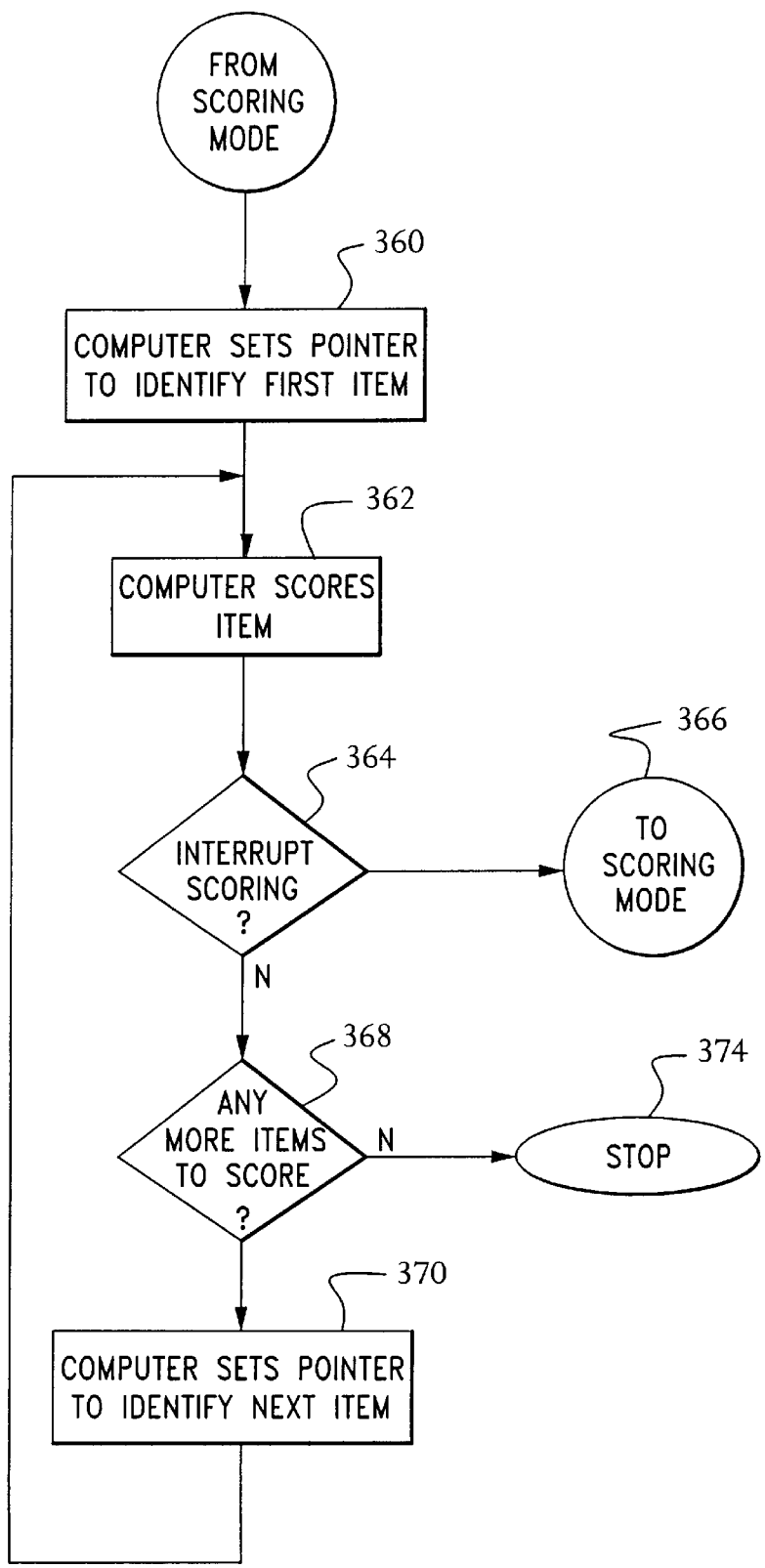
FIG. 10 shows a flowchart of the functions performed by a Continuous Scoring Subsystem.

As illustrated in FIG. 7, if continuous scoring is desired at step 210, the user selects continuous scoring mode at step 212 and the system 100 begins continuous scoring at step 214. The functions of a continuous scoring subsystem (CSS) 110 are shown in FIG. 10. The CSS 110 begins at step 360 by setting an internal pointer to identify the first selected item. At step 362, the CSS 110 calls the scoring engine 40 for the first selected item. The scoring engine 40 scores each feature in the examinee's response to the first selected item and returns the scores to the CSS 110. The CSS 110 then updates the database 44 with the feature scores and the overall item score. At step 364, the operator has an option to interrupt continuous scoring mode. If the operator chooses to interrupt continuous scoring at step 364, the CSS 110 returns control to the scoring mode selection subsystem (SMSS) 106 at step 366, and the operator can then choose to score selected items via another scoring mode or to stop scoring selected items (FIG. 7).

As long as the operator does not choose to interrupt continuous scoring mode, the CSS 110 continues to score selected items until no selected items remain to be scored. The CSS 110 determines at step 368 whether there are any more selected items to be scored. If so, the CSS 110 sets the pointer to identify the next item to be scored at step 370 and moves on to score the next selected item at step 362. If the CSS 110 determines at step 368 that there are no more selected items to be scored, the system stops at step 374.

Figure 11:
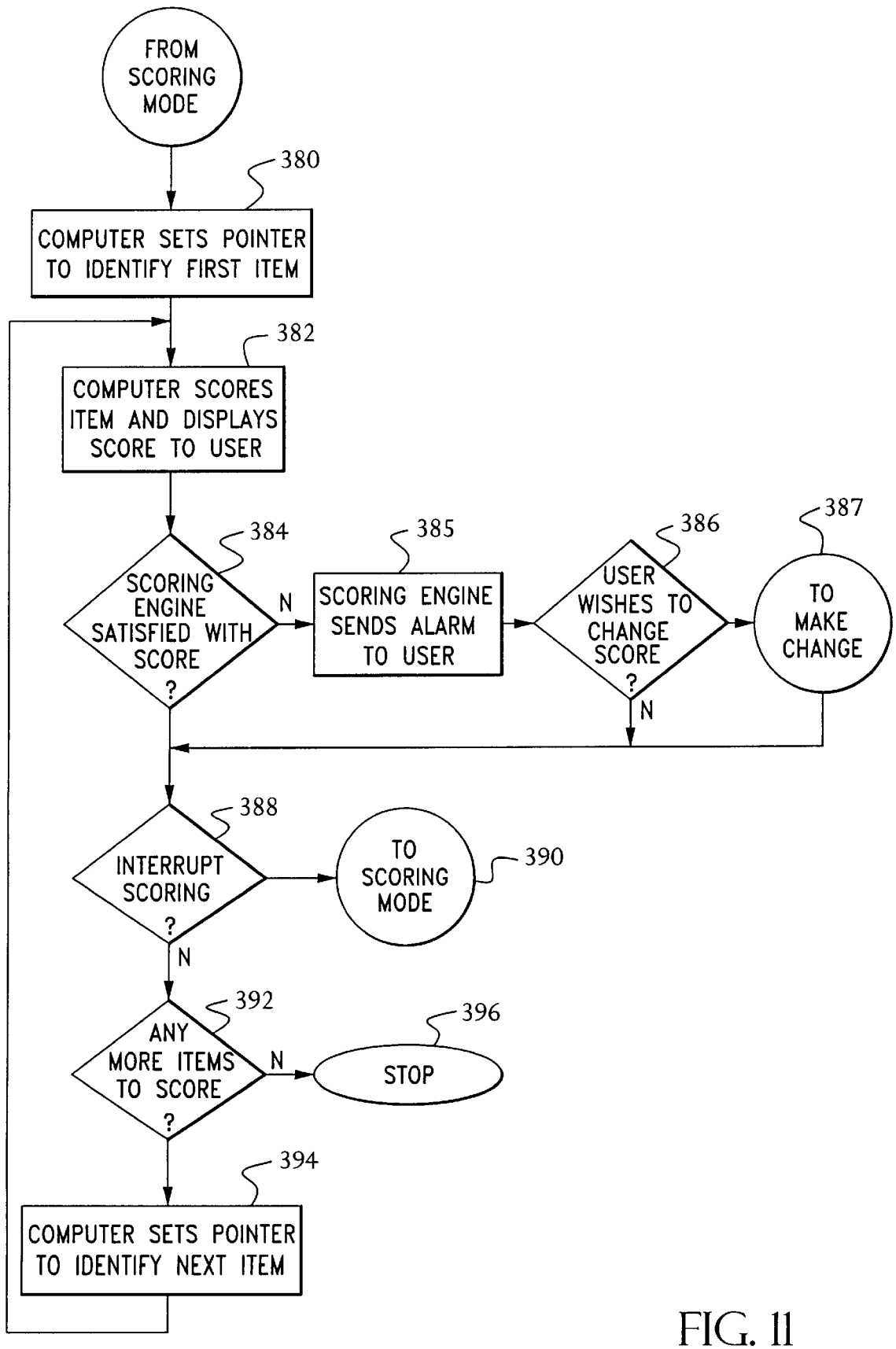
FIG. 11 shows a flowchart of the functions performed by an Alarm Scoring Subsystem.

As illustrated in FIG. 7, if alarm scoring is desired at step 220, the user selects alarm scoring mode at step 222 and the system 100 begins alarm scoring at step 224. The functions of an alarm scoring subsystem (ALM) 112 are shown in FIG. 11. The ALM 112 begins at step 380 by setting an internal pointer to identify the first selected item. At step 382, the ALM 112 calls the scoring engine 40 for the first selected item. The scoring engine 40 scores each feature in the examinee's response to the first selected item and returns the scores to the ALM 112. The ALM 112 then updates the database 44 with the feature scores and the overall item score.

At step 384, the scoring engine 40 determines whether an alarm condition has occurred, that is, whether there is a need for human intervention in the scoring of one or more features of the selected item. An alarm condition occurs, for example, when the scoring engine 40 detects a word or other element of a feature that the scoring engine 40 is not programmed to recognize.

If, at step 384, the scoring engine 40 detects an alarm condition, the scoring engine 40 notifies the user at step 385 by sending an alarm to the OWS 101. The alarm causes the feature scores and item score for the selected item to be displayed at the OWS 101. At step 386 the user determines whether to change a feature score or the overall item score. If the user decides at step 386 to change a score, the computer begins the process of changing scores at step 387. This process is the same as that described above for interactive scoring mode (see FIG. 9).

The operator chooses at step 388 to continue scoring items or to interrupt alarm scoring mode. If the operator chooses to interrupt alarm scoring mode at step 388, the ALM 112 returns control to the SMSS 106 at step 390. The operator can then choose another scoring mode, or to stop scoring selected items (FIG. 7).

If the operator does not choose to interrupt alarm scoring mode, the ALM 112 will determine at step 392 whether any more selected items remain to be scored. If not, the ALM 112 stops at step 396. If so, the ALM 112 increments the internal pointer at step 394 and repeats the process, beginning at step 382, for the next selected item.

Figure 12:
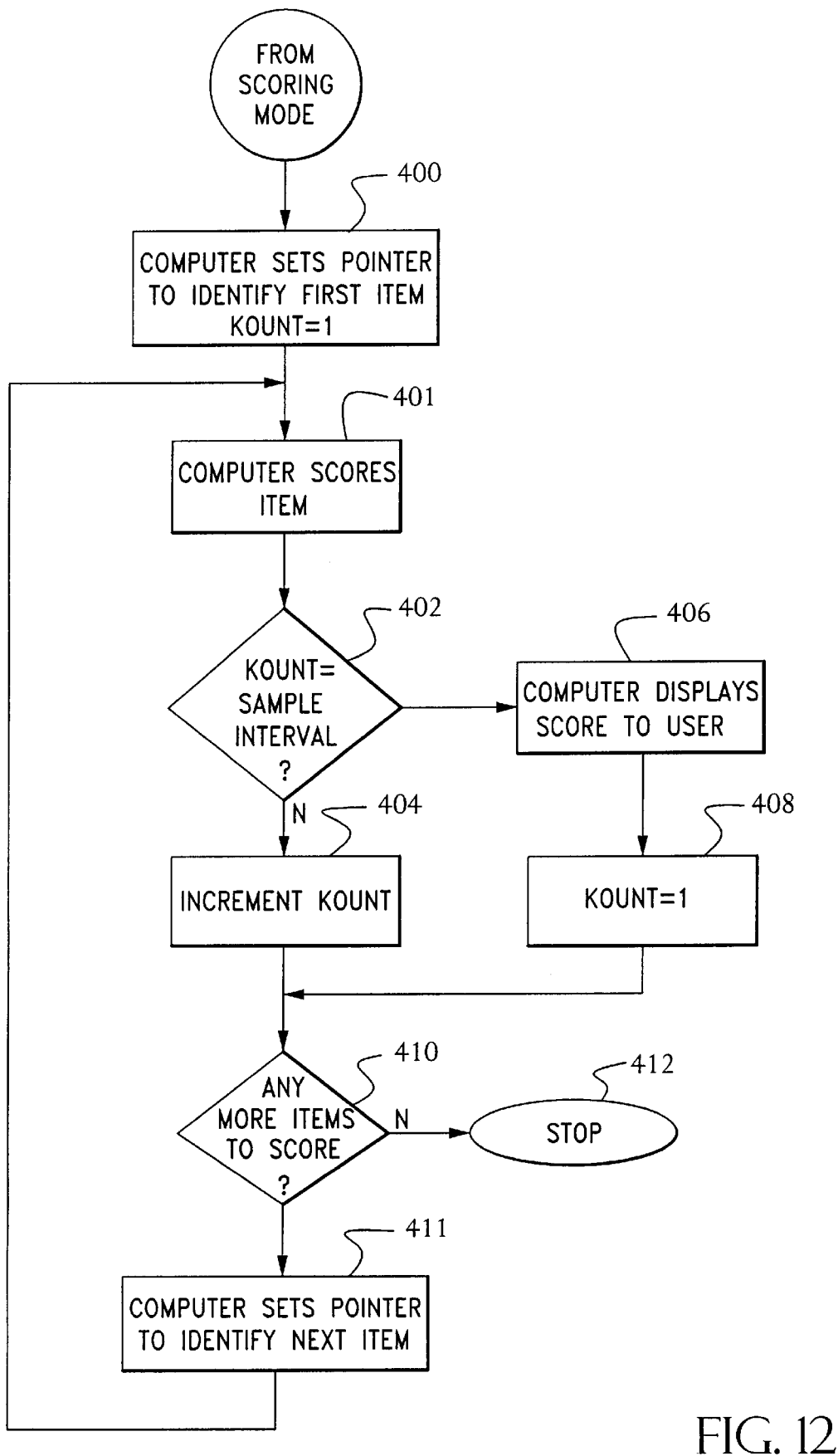
FIG. 12 shows a flowchart of the functions performed by a Sampling Scoring Subsystem.

As illustrated in FIG. 7, if sampling scoring is desired at step 230, the user selects sampling scoring mode at step 232 and the system 100 begins sampling scoring at step 234. The functions of a sampling scoring subsystem (SMP) 114 are shown in FIG. 12. As shown in FIG. 12, the SMP 114 begins at step 400 by setting an internal pointer to identify the first selected item and an internal counter (kount) equal to one. At step 401, the SMP 114 calls the scoring engine 40 for the selected item currently being identified by the pointer. The scoring engine 40 scores each feature in the examinee's response to the selected item and returns the scores to the SMP 114. The SMP 114 then updates the database 44 with the feature scores and the overall item score. At step 402 the SMP 114 determines whether the internal counter has reached a predetermined sample interval. If the SMP 114 determines at step 402 that the counter has not yet reached the sample interval, the SMP 114 increments the counter at step 404. If the SMP 114 determines at step 402 that the counter has reached the sample interval, then, at step 406, the SMP displays the feature scores and overall item score for the current item to the user via the OWS 101. In a preferred embodiment, the sample interval is set so that every nth selected item is displayed, where n is an integer. The SMP 114 then resets the counter to one at step 408. The SMP 114 determines at step 410 whether there are any more selected items to be scored. If the SMP 114 determines at step 410 that there are no more selected items to be scored, the SMP 114 stops at step 412. Otherwise, the SMP 114 sets the pointer to identify the next item to be scored at step 411 and proceeds to score the next item at step 401.

In a preferred embodiment, a user can command the computer to print out hard copy scoring reports. These scoring reports contain the feature scores and overall item score for selected items, as well as test scores for selected examinees.

By using the system and method of the present invention a test evaluator is now able to compare the computer generated score for the features and items of a test response against the scores the evaluator would have assigned to those features and items. If necessary, the test evaluator can change one or more feature scores or the overall item score online. The system then automatically uses the score(s) entered by the test evaluator to rescore items, if necessary, and to determine overall test scores. Thus, the test evaluator no longer needs to wait until the computer has finished scoring all the items before changing the desired scores manually.

Additionally, by using the system and method of the present invention a test evaluator is now able to evaluate the quality of the scoring rubrics being used to score the individual items and, if necessary, change the scoring engine which implements the scoring rubrics online. The system then automatically uses the changed rubric to score the affected item(s). The test evaluator no longer needs to wait for a computer programmer to implement changes to the scoring engines before a more accurate rubric can be used for scoring.

While the invention has been described and illustrated with reference to specific embodiments, those skilled in the art will recognize that modification and variations may be made without departing from the principles of the invention as described hereinabove and set forth in the following claims. For example, it is contemplated by the inventor that scoring for selected items will be distributed to a plurality of users, where each of the plurality of users interactively scores an item, and, when all users have scored the item, the computer assesses an overall item score based on the composite scores produced by the plurality of users.

We claim:

1. A method of scoring examinees' responses to standardized tests, each test having at least one item and each item having at least one feature, the scoring being performed by a computer that uses preexisting scoring engines that execute predefined scoring rubrics where each scoring rubric is associated with a particular item, said tests, items, and features, being stored in a database, the method comprising the steps of:

the user selecting from a list of predefined items displayed by the computer a number of items to be scored;

said computer generating a list of said selected items in said database; and scoring each said selected item in said list of selected items, said scoring step comprising the steps of:
(a) said computer generating an item score for a first selected item in said list of selected items using a scoring rubric associated with said first selected item, storing said item score in said database for said first selected item, and displaying said item score for review by the user,
(b) the user determining whether said item score for said first selected item is valid,
(c) if the user determines that said item score for said first selected item is invalid, the user changing the score for said first item,
(d) if the user has changed the item score for said first selected item, said computer storing in said database the item score entered by the user for said first selected item, and
(e) said computer determining whether any selected items remain unscored, and if any selected items remain unscored, said computer repeating steps (a)–(d) to score a second selected item in said list of selected items.

2. The method of claim 1, wherein the scoring step comprises the steps of:

said computer generating a feature score for each feature of said selected item using a scoring rubric associated with said selected item, storing said feature scores in said database for each said feature of said selected item, and displaying said feature scores for review by the user;

the user determining whether each said feature score for said selected item is valid;

if the user determines that one or more said features scores are invalid, the user changing said invalid feature scores for said selected item;

if the user has changed one or more feature scores for said selected item, said computer storing in said database the feature scores entered by the user for each said feature of said selected item; and said computer rescoring said selected item using the feature scores entered by the user for said selected item.

3. The method of claim 1, comprising the additional step of:

said computer scoring a test based on weighted item scores of the items that make up said test, according to a predefined weighting formula, said weighting formula being stored in said database for said test.

4. The method of claim 1, wherein the selecting step comprises the step of the user selecting said number of items to be scored in one of a plurality of selection modes, including:

a first mode wherein the user selects items individually, a second mode wherein the user selects items by test, and a third mode wherein the user selects items by examinee.

5. The method of claim 1, wherein the scoring step comprises the additional steps of:

the user determining whether the scoring rubric for said selected item is valid;

if the user determines that said scoring rubric for said selected item is invalid, the user changing the scoring rubric for said selected item; and if the user has changed said scoring rubric for said selected item, said computer using said changed scoring rubric for said selected item to rescore said selected item.

6. The method of claim 1, wherein the scoring step comprises the step of the user selecting from among a plurality of scoring modes, including:

a first scoring mode in which the user and said computer interactively score said selected items one at a time;

a second scoring mode in which said computer continuously scores said selected items;

a third scoring mode in which said computer continuously scores said selected items and, if an alarm condition is identified, stops continuously scoring said selected items and notifies the user of said alarm condition; and a fourth scoring mode in which said computer continuously scores said selected items, samples the number of selected items to be scored to create a subset, and displays the scores for said subset of selected items to the user.

7. The method of claim 6, wherein the scoring step comprises the additional steps of:

the user commanding the computer to stop scoring selected items;

the computer ceasing to score selected items, terminating the scoring mode previously selected by the user, and presenting the user with the option of selecting from among a plurality of scoring modes; and the user selecting one of the plurality of scoring modes.

8. A system for scoring responses to standardized tests, each test having at least one item, and each item having at least one feature, the system interfacing with a preexisting database and a number of preexisting scoring engines, the system comprising:

an operator workstation which accepts input from a user for processing, accepts processed output, and presents said processed output to the user;

an item selection subsystem coupled to said operator workstation and said database which creates a list of items selected by the user to be scored by accepting retrieve commands from said user via said operator workstation, retrieving predetermined items identified in said retrieve commands and stored in said database, delivering said predetermined items to the user via said operator workstation, accepting from the user via said operator workstation a list of items selected by the user, and storing a list of said selected items in said database; and an interactive scoring subsystem coupled to said operator workstation, said scoring engines, and said database, which scores the respective selected items by: (a) retrieving a first selected item from said database, (b) calling a scoring engine to score said first selected item, (c) storing an item score for said first selected item in the database, (d) delivering said item score for said first selected item to the operator workstation for display to the user, (e) if the user changes the item score for said first selected item, accepting said changed item score from the user via said operator workstation for said first selected item and storing said changed item score in said database for said first selected item, and (f) determining whether any items in said list of selected items remain unscored, and if any unscored items remain in said list of selected items, said interactive scoring subsystem scoring a second selected item by repeating steps (a)–(e) for said second selected item.

9. The system of claim 8, wherein the system further interfaces with a number of preexisting rescoring engines and wherein the interactive scoring subsystem is further coupled to said rescoring engines for rescoring a selected item by retrieving said selected item from said database, calling a scoring engine to score the features of said selected item, storing a feature score for each said feature and an item score for each said selected item in the database, delivering said feature scores and said item score to the operator workstation for display to the user, and, if the user determines one or more said feature scores to be invalid, accepting a changed feature score from the user via said operator workstation, updating the feature score for said feature in the database to said changed feature score, calling a rescoring engine to recompute the item score of said selected item, and storing said recomputed item score in said database.

10. The system of claim 8, wherein the item selection subsystem delivers said predetermined items to said operator workstation sorted one of three ways, by item, by test, or by examinee, and creates said item list in one of three modes, a first mode in which said item selection subsystem creates a list of individual items selected by the user, a second mode in which said item selection subsystem creates a list of items making up tests selected by the user, and a third mode in which said item selection subsystem creates a list of items allocated to examinees selected by the user.

11. The system of claim 8 further comprising:

a continuous scoring subsystem coupled to said operator workstation, said scoring engines, and said database, for scoring the respective selected items by retrieving each said selected item from said database, calling a scoring engine to score each said selected item, and storing an item score for each said selected item in the database; and a scoring mode selection subsystem coupled to said operator workstation, said interactive scoring subsystem, and said continuous scoring subsystem for presenting to the user via said operator workstation a choice of scoring modes, one such scoring mode corresponding to each said scoring subsystem, accepting from the user via said operator workstation a scoring mode selected by the user, commanding the scoring subsystem corresponding to said user selected scoring mode to begin scoring said selected items, and commanding said selected scoring subsystem to stop scoring said selected items in response to an interrupt from the user.

12. The system of claim 8 further comprising:

an alarm scoring subsystem coupled to said operator workstation, said scoring engines, and said database, for scoring the respective selected items by retrieving each said selected item from said database, calling a scoring engine to score each said selected item, storing an item score in said database for each said selected item, determining whether said item score is valid, and, if said item score is determined to be invalid, communicating an alarm to the user; and a scoring mode selection subsystem coupled to said operator workstation, said interactive scoring subsystem, and said alarm scoring subsystem for presenting to the user via said operator workstation a choice of scoring modes, one such scoring mode corresponding to each said scoring subsystem, accepting from the user via said operator workstation a scoring mode selected by the user, commanding the scoring subsystem corresponding to said user selected scoring mode to begin scoring said selected items, and commanding said selected scoring subsystem to stop scoring said selected items in response to an interrupt from the user.

13. The system of claim 8 further comprising:

a sampling scoring subsystem coupled to said operator workstation, said scoring engines, and said database, for scoring the respective selected items by retrieving each said selected item from said database, calling a scoring engine to score each said selected item, storing an item score for each said selected item in the database, and, for a subset of said selected items, delivering said item score to said operator workstation for display to the user, said subset being determined by a predefined item sampling period; and a scoring mode selection subsystem coupled to said operator workstation, said interactive scoring subsystem, and said sampling scoring subsystem for presenting to the user via said operator workstation a choice of scoring modes, one such scoring mode corresponding to each said scoring subsystem, accepting from the user via said operator workstation a scoring mode selected by the user, commanding the scoring subsystem corresponding to said user selected scoring mode to begin scoring said selected items, and commanding said selected scoring subsystem to stop scoring said selected items in response to an interrupt from the user.

14. The system of claim 13 wherein said subset of selected items consists of every n-th item of said selected items, where n is an integer.

15. The system of claim 8 wherein the operator workstation is coupled to said scoring engines for changing the predefined scoring rubrics executed by said scoring engines by accepting one or more changes to one or more said scoring rubrics from the user at said operator workstation, transmitting said changes from said operator workstation to said scoring engines, and modifying said scoring engine to execute said changed scoring rubric.

16. A system using predefined scoring rubrics to score examinees' responses to standardized tests, each test having at least one item and each item having at least one feature, the system interfacing with said database and a number of preexisting scoring engines, the system comprising:

means for selecting a number of predefined items from said existing database;

means for scoring a first selected item using said preexisting scoring engines employing predefined scoring rubrics associated with said first selected item;

means for determining whether the item score for said first selected item is valid; and means for interactively changing the item score for said first selected item if said item score is determined to be invalid and updating said database to include an updated item score for said first selected item without rescoring an entire test containing said first selected item.

17. The system of claim 16, further comprising:

means for scoring a second selected item using said preexisting scoring engines employing predefined scoring rubrics associated with said second selected item;

means for determining whether the item score for said second selected item is valid; and means for interactively changing the item score for said second selected item if said item score is determined to be invalid and updating said database to include an updated item score for said second selected item without rescoring an entire test containing said second selected item.

18. The system of claim 16, further comprising:

means for scoring a test based on the weighted item scores of the items associated with said test, according to a predefined weighting formula, said weighting formula being stored in said database for said test.

19. The system of claim 16, wherein said selecting means comprises means for selecting said number of predefined items in one of three modes, a first mode wherein items are selected individually, a second mode wherein items are selected by test, and a third mode wherein items are selected by examinee.

20. The system of claim 16, further comprising means for changing the predefined scoring rubric executed by said scoring engine and for modifying said scoring engine to execute said changed scoring rubric.

21. The system of claim 16, further comprising means for selecting from among a plurality of scoring modes:

a first scoring mode wherein a computer scores a first selected item, solicits input from a user regarding the validity of the item score assigned by said computer, and accepts user entered changes to said item score, before the computer scores the next selected item;

a second scoring mode wherein the computer scores items continuously;

a third scoring mode in which said computer continuously scores said selected items and, if an alarm condition is identified, stops continuously scoring said selected items and notifies the user of said alarm condition; and a fourth scoring mode in which said computer continuously scores said selected items, samples the number of selected items to be scored to create a subset, and displays the scores for said subset of selected items to the user.

22. The system of claim 21, further comprising means responsive to the user for interrupting one scoring mode and changing to another scoring mode.

23. The system of claim 16, further comprising:

means for scoring the features of a selected item and assigning feature scores to said features;

means for changing one or more of said assigned feature scores; and means for rescoring said selected item using said changed feature scores.

* * * * *

UNITED STATES PATENT AND TRADEMARK OFFICE
CERTIFICATE OF CORRECTION

PATENT NO.    : 6,120,299
DATED         : September 19, 2000
INVENTOR(S)   : Trenholm et al.

It is certified that error appears in the above-identified patent and that said Letters Patent is hereby corrected as shown below:

<u>Title page,</u>
Item [56], OTHER PUBLICATIONS, include the following publications in patent;
-- Abdel-fattah, "Comparison of the Chi-Square Procedure with the Symmetric Regression Procedure for Developing a Common Metric in Item Response Theory", Paper presented at the Joint Annual Meeting of the Psychometric Society and the Classification Society (New Brunswick, NJ, 19910, pp.1-12.

Adams et al., "Quest: The Innteractive Test Analysis System", Australian Council for Educational Research, 1993, pp. 1-90.

Burstein et al., "GE FRST Evaluation Report: How Well Does a Statistically-Based Natural Language Processing System Score Natural Language Constructed-Responses?", ETS Research Report RR-95-29, August 22, 1995, pp. 1-27.

de la Torre et al., "The Development and Evaluation of a Computerized Adaptive Testing System", Paper presented at the Annual Meeting of the National Council on Measurement in Education (Chicago, IL, April 4-6, 1991), pp. 1-25.

Gearhart et al., Writing Portfolios at the Elementary Level: A Study of Methods for Writing Assessment", Report No. CSE-TR-337 of the Center for Research on Evaluation, Standards, and Student Testing, Los Angeles, CA, 1992, pp. 1-57.

Halpin et al., "So You Have Chosen an Unequal Cell Size ANOVA Option -- Do you Really Know What you Have ?", Paper presented at the Annual Meeting of the Mid-South Educational Research Association (Lexington, KY, November 12-15, 1991), pp. 1-27.

Henning et al., "Automated Assembly of Pre-equated Language Proficiency Tests", Language Testing, 1994, Vol. 11, pp. 15-28.

Kaplan et al., "Using the Free-Response Scoring Tool to Automatically Score the Formulating-Hypotheses Item", ETS Research Report RR-94-08, June, 1994, pp. 1-41.

Sebrechts et al., "Agreement between Expert System and Human Rates' Scores on Complex Constructed-Response Quantitative Items", Journal of Applied Psychology, 1991, Vol.76, No. 6, pp. 856-862.

UNITED STATES PATENT AND TRADEMARK OFFICE
CERTIFICATE OF CORRECTION

PATENT NO. : 6,120,299 B1
DATED : September 19, 2001
INVENTOR(S) : Trenholm et al.

It is certified that error appears in the above-identified patent and that said Letters Patent is hereby corrected as shown below:

Smittle, "Computerized Adaptive Testing: Revolutionizing Academic Assessment", Community College J., Aug./Sep. 1994, Vol. 65, pp. 32-35.

Solomon et al., "A Pilot Study of the Relationship between Experts' Ratings and Scores Generated by the NBME's Computer-Based Examination System", Acad. Med., 1992, Vol. 67, pp. 130-132.

Stowitschek et al., "A Computerized Risk Index Screening Program for At-Risk Students", Paper presented at the Rural Education Symposium of the American Council on Rural Specials Education and the National Rural Small Schools Consortium (Tucson, Az, March 18-22, 1990), pp. 1-11.

Wang, "An Analytical Approach to Generating Norms for Skewed Normative Distributions", Paper presented at the Annual Meeting of the American Educational Research Association (San Francisco, CA, April 20-24, 1992), pp. 1-14.

Weiss et al., "User's Manual for the Basic Math Mastery Tests", Report No. MDS-144, National Center for Research in Vocational Education, December, 1992, pp. 1-32 --

Signed and Sealed this

Twenty-seventh Day of August, 2002

Attest:

*Attesting Officer*

JAMES E. ROGAN
*Director of the United States Patent and Trademark Office*